Aug. 4, 1925.

C. R. WESTBROOK 1,548,232

VALVE

Original Filed May 31, 1922

INVENTOR

Charles R. Westbrook

BY John A. Naismith

ATTORNEY

Patented Aug. 4, 1925.

1,548,232

UNITED STATES PATENT OFFICE.

CHARLES R. WESTBROOK, OF SAN FRANCISCO, CALIFORNIA, ASSIGNOR, BY MESNE ASSIGNMENTS, TO SIMPLEX AIR BRAKE COMPANY, A CORPORATION OF CALIFORNIA.

VALVE.

Application filed May 31, 1922, Serial No. 564,927. Renewed March 26, 1924.

*To all whom it may concern:*

Be it known that I, CHARLES R. WESTBROOK, a citizen of the United States, and resident of San Francisco, in the county of San Francisco and State of California, have invented a certain new and useful Improvement in Valves, of which the following is a specification.

My invention relates to a control valve of a type adapted to be used in connection with my vacuum operated control mechanism, disclosed in my copending application filed March 15, 1922, Serial Number 543,957.

It is an object of my invention to provide a valve which will allow a quick but easy application of the brakes of a vehicle with no danger of setting the same unless desired.

It is still another object to provide a valve of the character indicated which is provided with means for applying the brakes of a vehicle suddenly and with great force when necessary.

Still another object is to provide a valve of the character indicated that is simple to manufacture, easily installed upon a vehicle, easily operated and one that is highly efficient in its practical application.

In the drawing:—

Figure 1:
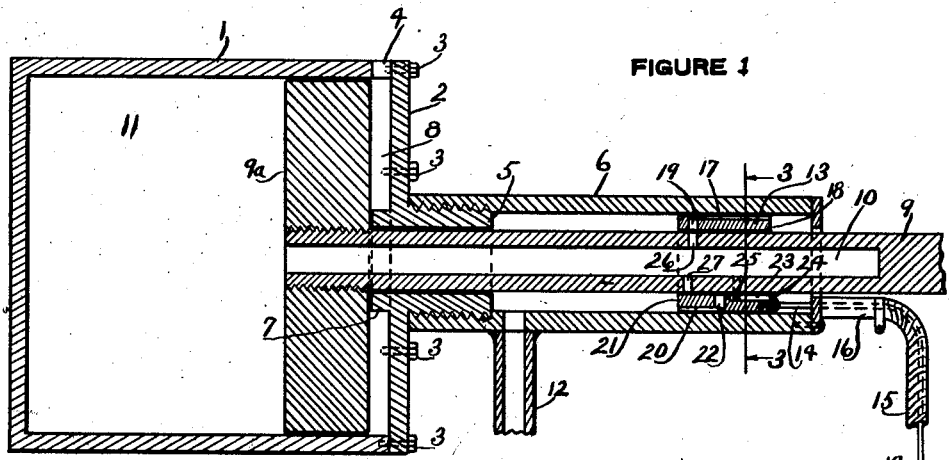
Figure 1 is a transverse cross-section through the brake operating mechanism showing my improved valve in its normal or inoperative position, parts broken away.
Figure 2:
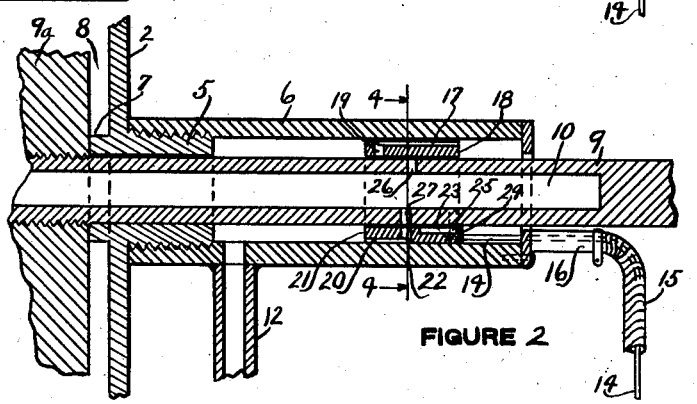
Figure 2 is a transverse cross-section through the brake operating mechanism showing my improved valve in position for an application of the brakes, parts being broken away to show a section of an internal combustion engine manifold.
Figure 3:
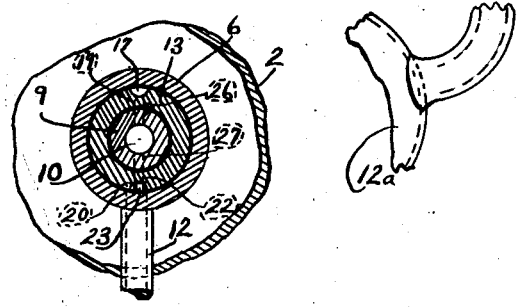
Figure 3 is a section on line 3—3 of Figure 1.
Figure 4:
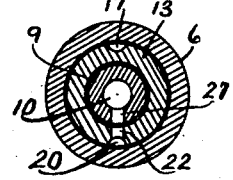
Figure 4 is a section on line 4—4 of Figure 2.

Referring more particularly to the drawing, I show at 1 a cylinder having a plate 2 covering the open end thereof and held in place by bolts 3 as shown. The interior of said cylinder 1 being open to the atmosphere by a passage as 4.

Formed integrally with plate 2 and projecting outwardly therefrom is an annular threaded boss 5 to which a cylinder 6 is secured as shown, while projecting inwardly from plate 2 is a second boss 7 having a thickness such as to provide a chamber 8 in said cylinder between plate 2 and a reciprocating piston 9ª placed therein. This chamber 8 being in direct communication with the atmosphere through the passage 4.

Passing through bosses 5 and 7 (which act as a bearing surface therefor) is a piston rod 9, having a portion thereof as 10 drilled out forming a chamber or passage which is in communication with the chamber 11 of cylinder 1, the said rod 9 connecting with the brake mechanism of the car not shown.

Secured to cylinder 6 and communicating with the interior thereof is a tube 12 which connects to the manifold of an internal combustion engine as at 12ª, or to any suitable suction mechanism not shown.

Slidably mounted upon piston rod 9 and within the cylinder 6 is a valve member 13 operated by a wire 14 running thru a flexible cable as 15. The said cable being attached to a bearing member 16 bolted to the outer end of the cylinder 6 as shown, this member forming a washer or collar covering the end of the cylinder except for an air inlet therein as shown.

Valve member 13 has a groove 17 cut in its outer surface for a given distance from one end as 18, this groove being in communication with a passage 19 formed through the wall of said cylinder 6.

Opposite from groove 17 and also upon the outer surface of member 13 is a second groove 20 cut therein for a short distance from the opposite end 21 of said member 13, this groove communicating with passage 22 formed through the wall of said cylinder 6 as shown.

Separated from passage 22 and cut in the inner surface of cylinder 13 is a groove 23 running to the end 18, as shown, where a stop member 24 is bolted. In this groove is a pin 25 set securely in the piston rod 9 as shown.

This pin being so located that when the inner end of groove 23 is against said pin, passage 19 in cylinder 6 is in direct communication with a passage 26 in piston rod 9, and when the pin 25 is against the stop member 24, passage 22 in cylinder 6 is in direct communication with a passage 27 in piston rod 9. Said passages 26—27 communicating with the chamber or passage 10 of the piston rod 9 and thus with the chamber 11 of the cylinder 1.

Figure 5:
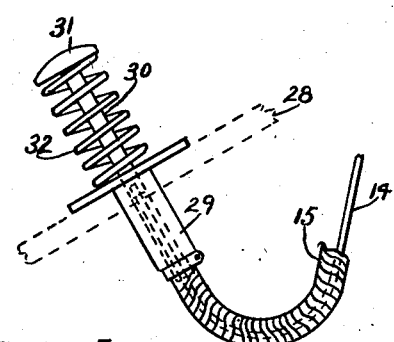
Figure 5 is a side elevation of the valve control means located upon the foot board of the vehicle, parts broken away.

At 28 in Figure 5 is shown the foot board of an automobile upon which is mounted the bearing 29 in which a plunger rod 30 operates, said rod being connected to the wire 14, and having a button 31 secured to one end thereof. Between said button 31 and bearing member 29 is placed a spring as 32, the same keeping the rod and button thereon extended as shown.

The normal or inoperative position of the device is shown in Figure 1, where the groove 17, passage ways 19—26—10 allow the chamber 11 of cylinder 1 to be connected directly with the atmosphere while passage way 4 in cylinder 1 connects chamber 8 with the atmosphere, thus the piston 9a and its rod 9 which is in connection with the brakes through suitable means not shown, remains stationary and the brakes are in the released position.

If the driver now presses down upon button 31 the wire 14 will slide the valve member 13 inwardly until pin 25 comes in contact with the stop member 24. In this position the passage ways 19—26 have been thrown out of alinement thus cutting off chamber 11 from the atmosphere while at the same time passage ways 22—27 have been brought into alignment connecting the interior of pipe 12 with chamber 11 through passage ways 10 in rod 9 and groove 20 in the member 13. Since pipe 12 is connected to the interior of the manifold of an internal combustion engine as at 12a, a suction or vacuum is established in chamber 11 which allows the atmospheric pressure in the chamber 8 to force the piston 9a inwardly thus applying the brakes. However, as the piston 9a and rod 9 move inwardly the passage 27 is brought out of alignment with passage 22 and this movement is stopped thus holding the pressure of the brakes because at this time the passages 19—26 have not been brought in to alignment to connect chamber 11 with the atmosphere.

To release the brakes, the driver relieves the pressure upon the button 31 and the action of spring 32 through wire 14 slides the valve member 13 outwardly until stopped by pin 25 thus bringing passages 19—26 again into alignment which as before stated connects chamber 11 with the atmosphere and the piston and piston rod move back into the release or normal position as shown. The spring 32 keeping the valve member 13 always in contact with pin 25 as the rod moves outwardly to this position.

It is now apparent that if a quick, full application of the brakes is desired, the driver keeps a steady downward pressure upon button 31 which will keep the stop member 24 of the valve member 13 in contact with pin 25 as the piston rod 9 continues to move inward as the pressure of the atmosphere continues against piston 9a.

Thus it is seen that I have provided a control valve that is simple, easy to manufacture and install and one that is highly efficient in its practical application as shown by the above description.

It is to be understood, of course, that while I have herein shown and described one particular embodiment of my invention, that changes in form, construction and method of operation may be made within the scope of the appended claims.

I claim:—

1. In a device of the character indicated an exhauster mechanism, a tube having ports therein, a sleeve slidably mounted thereon and having ports formed therein alternately registrable with the ports in said tube, one of said sleeve ports communicating with the atmosphere and the other with said exhauster mechanism.

2. In a device of the character indicated an exhauster mechanism, a casing, a tube slidably mounted therein and provided with ports, a sleeve slidably mounted on said tube and in said casing and having ports formed therein alternately registrable with the ports in said tube, one of said sleeve ports communicating with the atmosphere and the other with said exhausted mechanism.

3. In a device of the character indicated an exhauster mechanism, a casing, a tube slidably mounted therein and provided with ports, a sleeve slidably mounted on said tube and in said casing and having ports formed therein alternately registrable with the ports in said tube, one of said sleeve ports communicating with the atmosphere and the other with said exhauster mechanism, and means for limiting the movement of said sleeve in either direction.

4. In a device of the character indicated, an exhauster mechanism, a casing, a chamber arranged at one end thereof, a tube provided with ports slidably mounted therein and communicating with said chamber, a piston head mounted on said tube within said chamber, a sleeve slidably mounted on said tube and within said casing and having ports formed therein alternately registrable with the ports in said tube, one of said sleeve ports communicating with the atmosphere and the other with said exhauster mechanism.

CHARLES R. WESTBROOK.